United States Patent
MacKinnon et al.

(10) Patent No.: US 8,354,201 B2
(45) Date of Patent: Jan. 15, 2013

(54) FUEL CELL WITH SPATIALLY NON-HOMOGENEOUS IONIC MEMBRANE

(75) Inventors: Sean M MacKinnon, Fairport, NY (US); Timothy J. Fuller, Pittsford, NY (US); Annette M. Brenner, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 561 days.

(21) Appl. No.: 12/549,885

(22) Filed: Aug. 28, 2009

(65) Prior Publication Data
US 2011/0053037 A1  Mar. 3, 2011

(51) Int. Cl.
*H01M 8/10* (2006.01)
*H01M 2/16* (2006.01)
*C08F 214/14* (2006.01)

(52) U.S. Cl. ...... 429/492; 429/493; 429/494; 525/326.2; 525/199; 525/200; 526/250; 526/252

(58) Field of Classification Search .................. None
See application file for complete search history.

(56) References Cited

U.S. PATENT DOCUMENTS

| | | | |
|---|---|---|---|
| 5,006,408 A | 4/1991 | Green et al. | |
| 5,021,602 A | 6/1991 | Clement et al. | |
| 5,037,917 A | 8/1991 | Babb et al. | |
| 5,066,746 A | 11/1991 | Clement et al. | |
| 5,159,037 A | 10/1992 | Clement et al. | |
| 5,159,038 A | 10/1992 | Babb et al. | |
| 5,910,378 A | 6/1999 | Debe et al. | |
| 6,124,060 A | 9/2000 | Akita et al. | |
| 6,183,668 B1 | 2/2001 | Debe et al. | |
| 6,277,512 B1 | 8/2001 | Hamrock et al. | |
| 6,284,399 B1 | 9/2001 | Oko et al. | |
| 6,444,343 B1 | 9/2002 | Prakash et al. | |
| 6,523,699 B1 | 2/2003 | Akita et al. | |
| 6,559,237 B1 * | 5/2003 | Mao et al. .................. | 525/326.2 |
| 6,783,878 B2 | 8/2004 | Voss et al. | |
| 6,847,518 B2 | 1/2005 | Fukuda et al. | |

(Continued)

FOREIGN PATENT DOCUMENTS

JP   2003535929 T   12/2003

(Continued)

OTHER PUBLICATIONS

Smith, D.W. et al, "Perfluorocyclobutane Aromatic Polyethers. Synthesis and Characterization of New Siloxane-Containing Fluoropolymers," Macromolecules 1996, v. 29, pp. 852-860.

(Continued)

*Primary Examiner* — Keith Walker
(74) *Attorney, Agent, or Firm* — Brooks Kushman P.C.

(57) ABSTRACT

A fuel cell includes a first flow field plate defining at least one flow field channel. A cathode catalyst layer is disposed over at least a portion of the first flow field plate. A polymeric ion conducting membrane is disposed over cathode catalyst layer. An anode catalyst layer is disposed over the polymeric ion conducting membrane. Finally, a second flow field plate defining at least one flow field channel is disposed over the anode catalyst layer. The polymeric ion conducting membrane extends beyond the cathode catalyst layer and the anode catalyst layer such that the fuel cell has at least one peripheral region with the polymeric catalyst layer interposed between first flow field plate and the second flow field plate without the cathode catalyst layer and the anode catalyst layer.

17 Claims, 4 Drawing Sheets

U.S. PATENT DOCUMENTS

| | | | |
|---|---|---|---|
| 6,864,005 B2 | 3/2005 | Mossman | |
| 6,875,537 B2 | 4/2005 | Tani et al. | |
| 6,884,536 B1 | 4/2005 | Hatoh et al. | |
| 6,926,984 B2 | 8/2005 | Asano et al. | |
| 6,933,068 B2 | 8/2005 | Asano et al. | |
| 6,953,653 B2 | 10/2005 | Smith et al. | |
| 6,986,962 B2 | 1/2006 | Oyanagi et al. | |
| 7,001,929 B2 | 2/2006 | Goto et al. | |
| 7,045,241 B2 | 5/2006 | Akita et al. | |
| 7,153,802 B2 * | 12/2006 | Manco et al. | 502/101 |
| 2001/0018144 A1 | 8/2001 | Watakabe et al. | |
| 2002/0014405 A1 | 2/2002 | Arcella et al. | |
| 2003/0017379 A1 | 1/2003 | Menashi | |
| 2004/0214058 A1 | 10/2004 | Tada et al. | |
| 2004/0214065 A1 | 10/2004 | Kanaoka et al. | |
| 2004/0241515 A1 | 12/2004 | Brenner et al. | |
| 2005/0014927 A1 | 1/2005 | Akita | |
| 2005/0043487 A1 | 2/2005 | Felix et al. | |
| 2005/0048342 A1 | 3/2005 | Wakahoi et al. | |
| 2005/0053810 A1 | 3/2005 | Kato et al. | |
| 2005/0058864 A1 | 3/2005 | Goebel | |
| 2005/0064260 A1 | 3/2005 | Otsuki et al. | |
| 2005/0100770 A1 | 5/2005 | Sugawara et al. | |
| 2005/0106440 A1 | 5/2005 | Komiya | |
| 2005/0116206 A1 | 6/2005 | Kakuta et al. | |
| 2005/0130024 A1 | 6/2005 | Otsuki et al. | |
| 2005/0142397 A1 | 6/2005 | Wakahoi et al. | |
| 2005/0143530 A1 | 6/2005 | Iwadate et al. | |
| 2005/0175886 A1 | 8/2005 | Fukuda et al. | |
| 2005/0197467 A1 | 9/2005 | Komiya et al. | |
| 2005/0227138 A1 | 10/2005 | Fukuda et al. | |
| 2005/0233181 A1 | 10/2005 | Wariishi et al. | |
| 2005/0260474 A1 | 11/2005 | Asano et al. | |
| 2006/0019147 A1 | 1/2006 | Fukuda et al. | |
| 2006/0127728 A1 | 6/2006 | Otsuki et al. | |
| 2006/0177719 A1 | 8/2006 | Fuller et al. | |
| 2007/0042242 A1 | 2/2007 | Tada et al. | |
| 2007/0099054 A1 * | 5/2007 | Fuller et al. | 429/33 |
| 2007/0141237 A1 | 6/2007 | Okiyama et al. | |
| 2007/0196720 A1 | 8/2007 | Skala | |
| 2008/0001313 A1 | 1/2008 | Zhang et al. | |
| 2008/0027152 A1 | 1/2008 | Maier et al. | |
| 2008/0102335 A1 | 5/2008 | Skala | |
| 2008/0182149 A1 | 7/2008 | Zhang et al. | |
| 2008/0199753 A1 * | 8/2008 | Fuller et al. | 429/33 |
| 2008/0241636 A1 | 10/2008 | Andreas-Schott et al. | |
| 2009/0092863 A1 | 4/2009 | Skala | |
| 2009/0278083 A1 | 11/2009 | Fuller et al. | |
| 2009/0278091 A1 | 11/2009 | Mackinnon et al. | |
| 2009/0281245 A1 | 11/2009 | Mackinnon et al. | |
| 2009/0281262 A1 | 11/2009 | MacKinnon et al. | |
| 2009/0281270 A1 | 11/2009 | Fuller et al. | |

FOREIGN PATENT DOCUMENTS

| | | |
|---|---|---|
| JP | 2005129298 A | 5/2005 |
| JP | 2005166557 A | 6/2005 |
| JP | 2005179380 A | 7/2005 |
| JP | 2009 249 487 A | 10/2009 |
| WO | 2004/051776 | 6/2004 |
| WO | 2007/052954 A1 | 5/2007 |

OTHER PUBLICATIONS

Smith, D.W. et al, "Perfluorocyclobutane (PFCB) polyaryl ethers: versatile coatings material," J. of Fluorine Chem., v. 104, pp. 109-117 (2000).

Souzy, R. et al "Functional fluoropolymers for fuel cell membranes," Solid State Ionics, v. 176, pp. 2839-2848 (2005).

Souzy, R. et al., "Functional fluoropolymers for fuel cell membranes," Prog. Polm. Sci. 30, 2005, pp. 644-687.

"Fluorel Technical Data Sheets," MatWeb Material Property Data website, http://www.matweb.com/search/GetMatlsByTradename. aspx?navletter=F&tn=Fluorel%E2%84%A2.

Nafion perfluorinated resin, Sigma-Aldrich Online Catalog, http://www.sigmaaldrich.com/catalog/ProductDetail.do?lang=en &N4=495786|ALDRICH&N5=SEARCH_CONCAT_PNO|BRAND_KEY&F=SPEC.

Ford, L.A. et al., "New Aromatic Perfluorovinyl Ether Monomers Containing the Sulfonimide Acid Functionality," Polymeric Materials Science & Eng., v. 83, 2000, pp. 10-11 (American Chemical Society).

Souzy, R. et al., "Synthesis and (co)polymerization of monofluoro, difluoro, trifluorostyrene and ((trifluorovinyl)oxy) benzene," Prog. Polm. Sci. 29 (2004), pp. 75-106.

"Fluorel Technical Data Sheets," MatWeb Material Property Data website, http://www.matweb.com/search/GetMatlsByTradename. aspx?navletter=F&tn=Fluorel%E2%84%A2, copyright 1996-2010.

Nafion perfluorinated resin, Sigma-Aldrich Online Catalog, http://www.sigmaaldrich.com/catalog/ProductDetail.do?lang=en &N4=495786|ALDRICH&N5=SEARCH_CONCAT_PNO|BRAND_KEY&F=SPEC, copyright 2010.

Ford, L.A. et al., "New Aromatic Perfluorovinyl Ether Monomers Containing the Sulfonimide Acid Functionality," Polymeric Materials Science & Eng., v. 83, 2000, pp. 10-11.

* cited by examiner

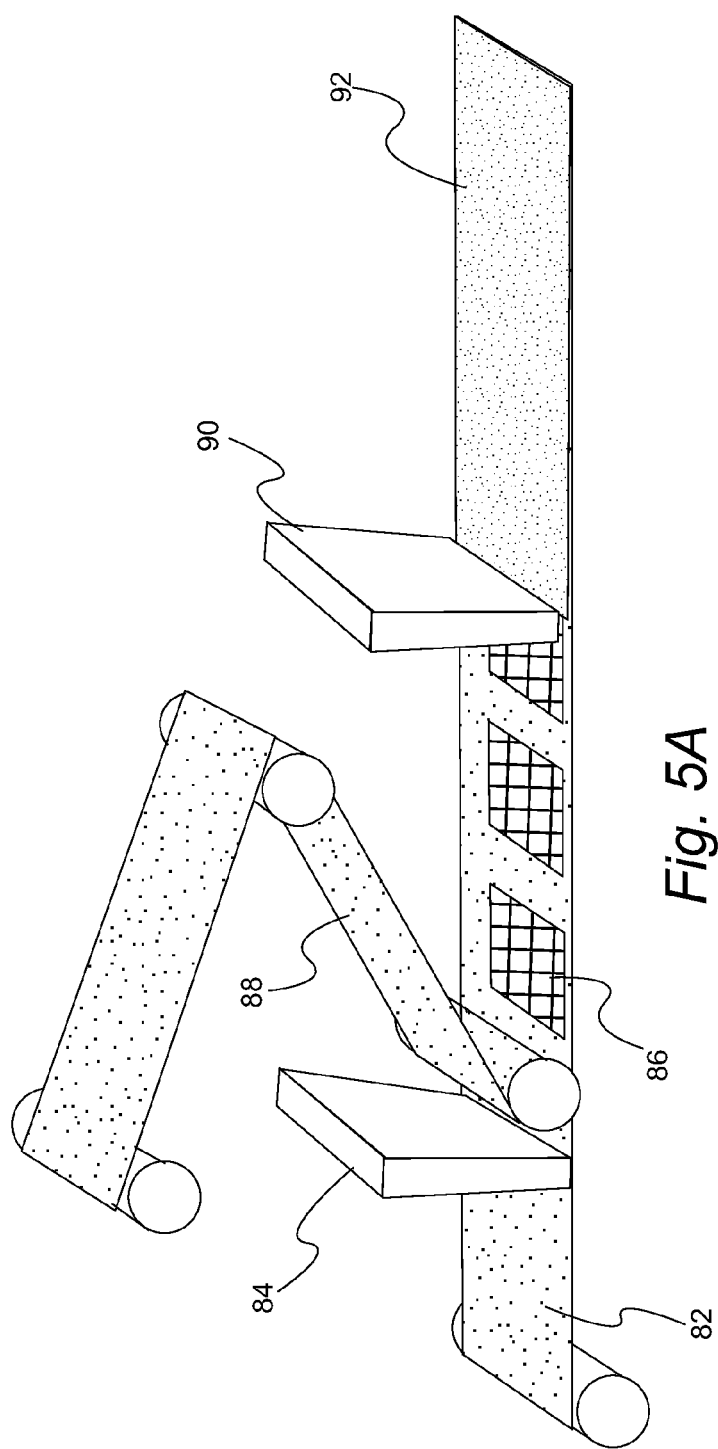
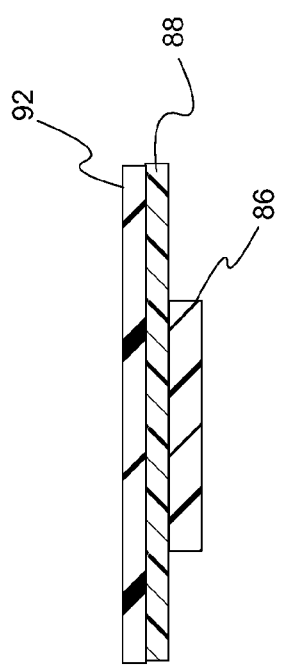
Fig. 5A
Fig. 5B

FUEL CELL WITH SPATIALLY NON-HOMOGENEOUS IONIC MEMBRANE

TECHNICAL FIELD

The invention relates to a fuel cell and more particularly to humidification of fuel cells.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM"), to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

The internal membranes used in fuel cells are typically maintained in a moist condition. This helps avoid damage to or a shortened life of the membranes, as well as to maintain the desired efficiency of operation. For example, lower water content of the membrane leads to a higher proton conduction resistance, thus resulting in a higher ohmic voltage loss. The humidification of the feed gases, in particular the cathode inlet, is desirable in order to maintain sufficient water content in the membrane, especially in the inlet region. Humidification in a fuel cell is discussed in commonly owned U.S. patent application Ser. No. 10/797,671 to Goebel et al.; commonly owned U.S. patent application Ser. No.10/912,298 to Sennoun et al.; and commonly owned U.S. patent application Ser. No. 11/087,911 to Forte, each of which is hereby incorporated herein by reference in its entirety.

To maintain a desired moisture level, an air humidifier is frequently used to humidify the air stream used in the fuel cell. The air humidifier normally consists of a round or box type air humidification module that is installed into a housing. Examples of this type of air humidifier are shown and described in U.S. patent application Ser. No. 10/516,483 to Tanihara et al., and U.S. Pat. No. 6,471,195, each of which is hereby incorporated herein by reference in its entirety.

Membrane humidifiers have also been utilized to fulfill fuel cell humidification requirements. For the automotive fuel cell humidification application, such a membrane humidifier needs to be compact, exhibit low pressure drop, and have high performance characteristics.

Designing a membrane humidifier requires a balancing of mass transport resistance and pressure drop. To transport from wet side to dry side through a membrane, water molecules must overcome some combination of the following resistances: convectional mass transport resistance in the wet and dry flow channels; diffusion transport resistance through the membrane; and diffusion transport resistance through the membrane support material. Compact and high performance membrane humidifiers typically require membrane materials with a high water transport rate (i.e. GPU in the range of 10000-12000). GPU or gas permeation unit is a partial pressure normalized flux where 1 GPU=$10^{-6}$ $cm^3$ (STP)/($cm^2$ sec cm Hg). As a result, minimizing the transport resistance in the wet and dry flow channels and the membrane support material becomes a focus of design.

Accordingly, there is a need for improved methodology for humidifying fuel cells.

SUMMARY OF THE INVENTION

The present invention solves one or more problems of the prior art by providing in at least one embodiment a fuel cell with an integrated humidifier. The fuel cell of this embodiment includes a first flow field plate defining at least one flow field channel. A cathode catalyst layer is disposed over at least a portion of the first flow field plate. A polymeric ion conducting membrane is disposed over cathode catalyst layer. An anode catalyst layer is disposed over the polymeric ion conducting membrane. Finally, a second flow field plate defining at least one flow field channel is disposed over the anode catalyst layer. The polymeric ion conducting membrane extends beyond the cathode catalyst layer and the anode catalyst layer such that the fuel cell have at least one peripheral region with the with the polymeric catalyst layer interposed between first flow field plate and the second flow field plate without the cathode catalyst layer and the anode catalyst layer. It is this peripheral region that is useful for humidification.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein:

FIG. 5A is an illustration depicting a method for making the polymer membranes; and FIG. 5B is a cross section of the polymeric membrane made by the method of FIG. 5A.

DETAILED DESCRIPTION OF THE PREFERRED EMBODIMENT(S)

Figure 1:
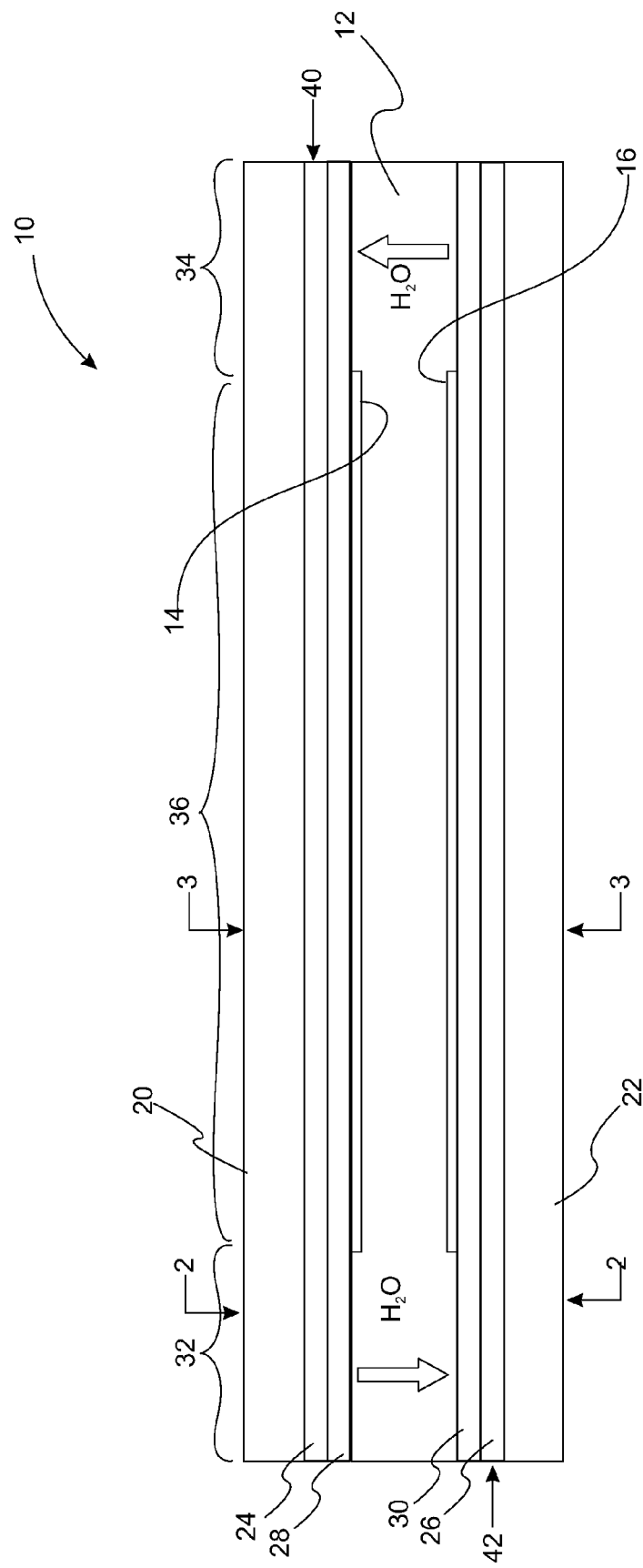
FIG. 1 provides a schematic of a fuel cell with an integrating humidifier therein.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 2:
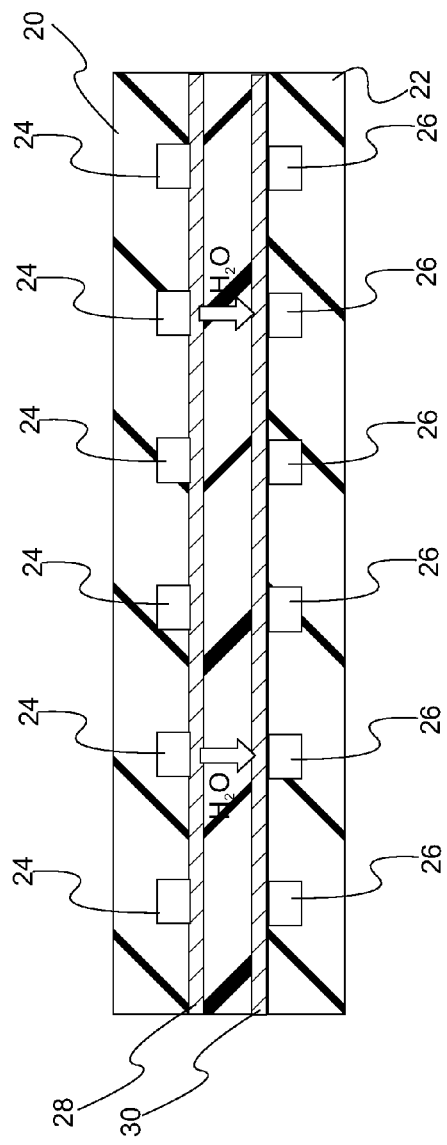
FIG. 2 is a cross section of the fuel cell depicted in FIG. 1 in a peripheral region.
Figure 3:
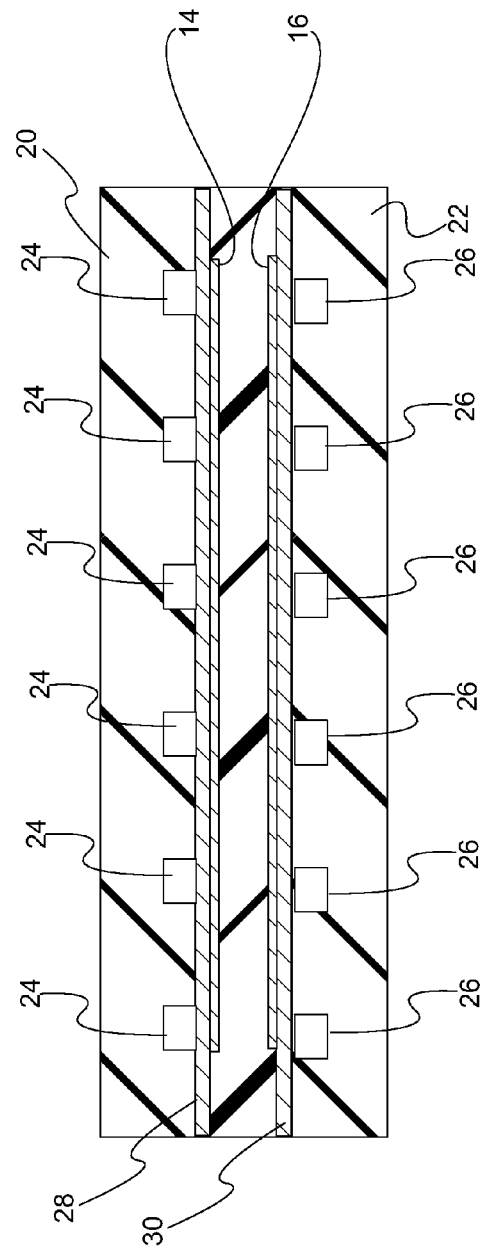
FIG. 3 is a cross section of the fuel cell depicted in FIG. 1 in a central region at which electrochemical processes occur.

With reference to FIGS. 1, 2, and 3, schematics of a fuel cell having integrated humidifying capability is provided. FIG. 1 is a schematic show the construction of the fuel cell. FIGS. 2 and 3 are cross sectional views. Fuel cell 10 includes polymeric ion conductive membrane 12 disposed between cathode catalyst layer 14 and anode catalyst layer 16. Fuel cell 10 also includes conductive plates 20, 22, gas channels 24 and 26, and gas diffusion layers 28 and 30. Fuel cell 10 is characterized by having peripheral regions 32, 34 in which cathode catalyst layer 14 and anode catalyst layer 16 are absent. It is in this region where humidification occurs with water moving from a wet exhaust to a relatively dry inlet gas stream. FIG. 2 is a cross section in region 32. It is in this region where humidification occurs with water moving from a wet exhaust to a relatively dry inlet gas stream. FIG. 2 is a cross section in region 32. It is in this region where humidification occurs with water moving from a wet exhaust to a relatively dry inlet gas stream. For example, a first gas containing oxygen enters gas channel 24 at end 40. The electrochemical reaction occurring in the vicinity of cathode catalyst layer 14 produces water. Therefore, the exhaust gas, in the vicinity of region 32, has higher water content than the gas entering the channel. Moisture from channel 24 passes through polymer membrane 12 to channel 26. The second gas stream which enters channel 26 at location 42 is accordingly humidified. Transfer of water back from channel 26 to channel 24 may also occur in region 34. Finally, the electrochemical reactions characteristic of a fuel cell occurs in region 36. FIG. 3 is a cross section in region 36.

In a variation of the present embodiment, polymeric ion conducting membrane 12 comprises a non-homogeneous polymeric layer. The non-homogeneity allows membrane 12 to be optimized for ion transport in region 36 and moisture transport in regions 32, 34. An example of a particularly useful non-homogeneous is provided in U.S. patent application Ser. No. 12/197874. The entire disclosure of this patent application is hereby incorporated by reference. In at least one embodiment, the non-homogeneous layer is a blend of a first polymer comprising cyclobutyl moiety; and a second polymer having a non-ionic polymer segment. The weight ratio of the first polymer to the second polymer varies as a function of position within the non-homogeneous layer. The blend composition may be cast into an electrolyte membrane that can be used to prepare electrochemical cells such as batteries and fuel cells. Advantageously, the spatially varying properties can be spatially tailored to meet the spatially varying requirements of a fuel cell regarding durability and performance. In a variation, the non-homogeneous polymeric layer has a sheet-like spatial configuration with a first and second spatial dimension that is greater than a third spatial dimension. In a refinement, the weight ratio of first polymer to the second polymer varies as a function of the first and second spatial dimension. Specifically, the weight ratio varies within a plane and is independent of the third direction.

Figure 4A:
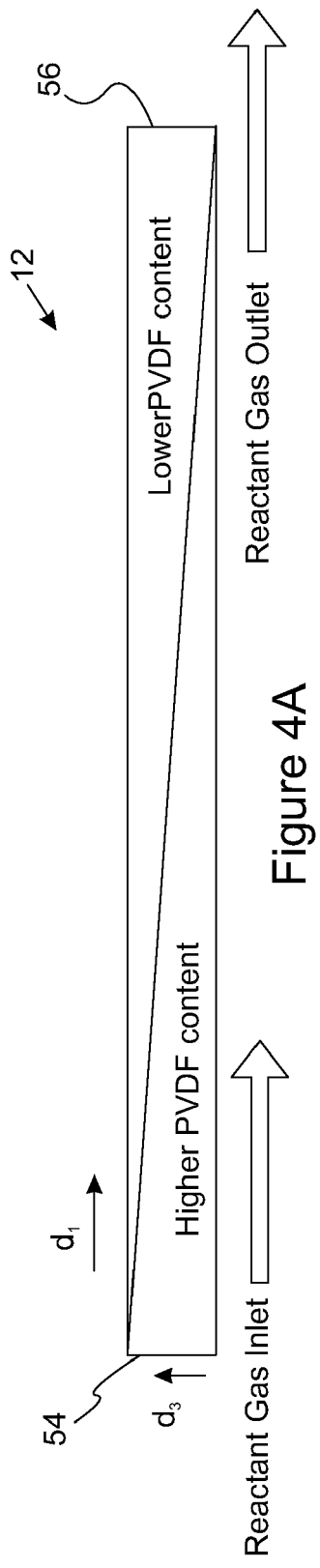
FIG. 4A-C provide illustrations of in homogeneous polymeric membranes.
Figure 4B:
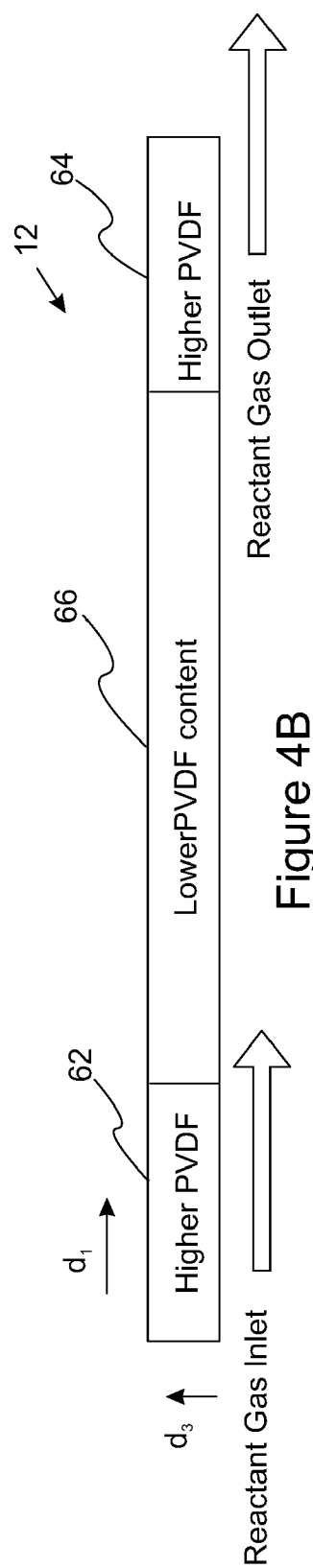
Figure 4C:
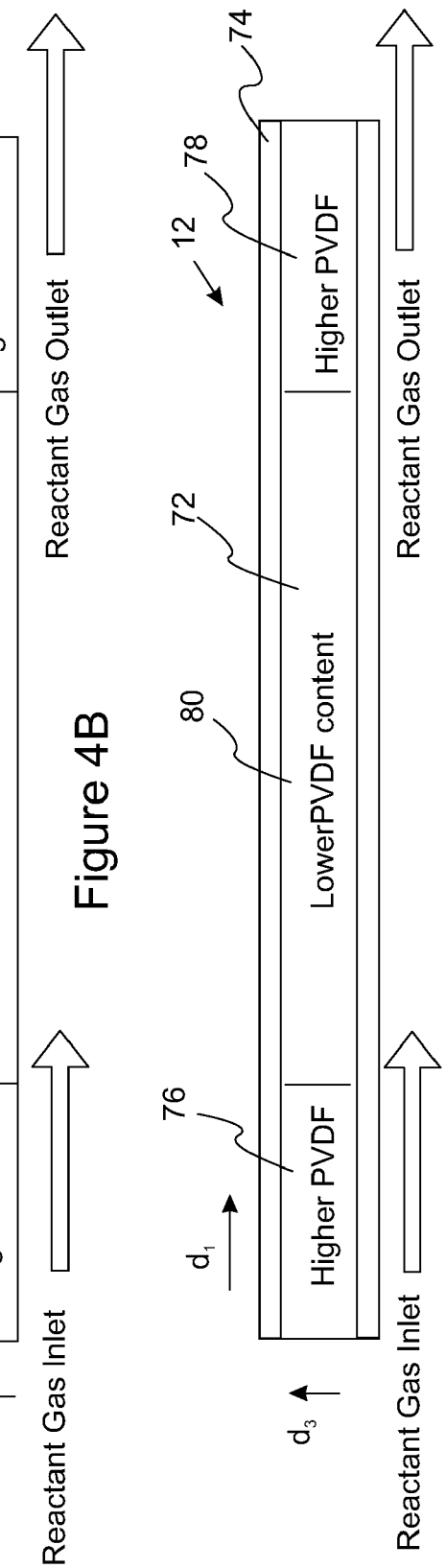

With reference to FIGS. 4A, 4B, and 4C, illustrations of various exemplary examples in which the weight ratio of the first polymer to the second polymer vary in a plane are provided. FIG. 4A provides a schematic cross section of an example in which the amount of the second polymer in polymeric ion conductive membrane 12 varies monotonically along direction $d_1$ from location 54 to location 56. In a further refinement, the concentrations are substantially independent of direction $d_3$. In this variation, the higher concentrations of the second polymer are designed to be adjacent to the gas inputs where higher durability is desirable. FIG. 4B provides a schematic cross section of an example in which the amount of the second polymer is higher in the vicinity of the gas inlet and outlet. In this variation polymeric ion conductive membrane 12 has higher concentrations of the second polymer at locations 62 and 64 with lower amounts at location 66. FIG. 4C provides a schematic cross section of an example in which the amount of the second polymer is higher in the vicinity of the gas inlet and outlet. In this variation, polymeric ion conductive membrane 12 includes polymer layer 72 which is imbibed into porous support 74. Polymer layer 72 has higher concentrations of the second polymer at locations 76 and 78 with lower amounts at location 80. In these figures, direction $d_2$ (not shown) is perpendicular to $d_1$ and $d_3$ such that $d_1$ and $d_2$ define the plane over which the concentrations vary in these variations.

With reference to FIG. 5A, a schematic illustration of an apparatus for forming polymer membrane 12 is provided. Carrier film 82 is coated with a first PFCB blend ionomer in a solution (e.g., DMAC) applied from slot die coater 84 to form first polymeric layer 86 of polymeric ion conductive membrane 12. In a refinement, layer 86 is confined to region 36 of polymeric ion conductive membrane 12. Porous support 88 is placed over the coated carrier film. Slot die coater 90 is used to apply a second PFCB blend ionomer in a solution (e.g., DMAC) porous support 88 to form second polymer layer 92. Polymer layer 92 is such that the water transfer in peripheral regions 32, 24 is improved over membranes not having this second layer. The first and second PFCB blend ionomers in a solution are set forth below. Polymeric membrane 12 is depicted in FIG. 5B. Polymeric membrane 12 includes porous polymeric support 88. First layer 86 is disposed on side 92 or support 88 while second layer 90 is disposed over surface 94. In a refinement, one or both of polymer layers 86, 90 penetrate into support 88.

In one refinement, the first polymer is present in an amount from about 1 to about 95 weight percent of the total weight of the polymer blend. In another refinement, the first polymer is present in an amount from about 20 to about 90 weight percent of the total weight of the polymer blend. In another refinement, the first polymer is present in an amount from about 40 to about 80 weight percent of the total weight of the polymer blend. In another refinement, the first polymer is present in an amount from about 5 to about 95 weight percent of the total weight of the polymer blend. In another refinement, the fluoroelastomer is present in an amount from about 5 to about 99 weight percent of the total weight of the polymer blend. In still another refinement, the fluoroelastomer is present in an amount from about 10 to about 80 weight percent of the total weight of the polymer blend. In still another refinement, the fluoroelastomer is present in an amount from about 20 to about 60 weight percent of the total weight of the polymer blend. The first polymer that includes a cyclobutyl moiety may be any such polymer with sufficient ionic conductivity and ion exchange capacity. The first polymer that includes a cyclobutyl moiety may comprise aliphatic or aromatic fluorine containing structure segments that are stable in a wide temperature range and in the harsh chemical environment of an electrochemical cell. The fluorine containing chemical structure also facilitates favorable interaction with the fluoro-elastomer in the blend composition for uniform and intimate mixing. The first polymer that includes a cyclobutyl moiety also comprises an ionic group to provide ionic conductivity and ion exchange capacity. The ionic group may comprise, for example, a hydrocarbon based or fluorocarbon based carboxylic acid, sulfonic acid, sulfonamide, phosphonic acid and their salts. The ionic conductivity of the polymer electrolyte may range from 0.001 siemen/cm to about 10 siemen/cm. In one embodiment, the polymer electrolyte is a copolymer comprising at least one hydrophilic ionic segment and one fluorine containing hydrophobic segment.

In a refinement, the first polymer that includes a cyclobutyl moiety has an ion exchange capacity (IEC) greater than about 0.2 meq/gram (miliequivalent per gram), or preferably, between about 0.5 meq/gram and 4 meq/gram. IEC of a known polymer structure may be calculated by simply dividing the number of sulfonic acid groups per repeating monomer unit by the formula weight of the repeating monomer unit, and multiplying the result by 1000. For polymer electrolyte with unknown degree of sulfonation, IEC can be determined experimentally. The experiment method used here to determine IEC value takes a measured weight of dried polymer electrolyte solid or membrane, and calculates an acid molar equivalent based on the first inflection point of a titration curve near pH 7. Specifically, an electrolyte sample is dried in an oven at about 80° C., optionally under vacuum. After the dried sample is allowed to cool to room temperature in a capped container, the sample is quickly weighed into a titration cup. The sample of known dry weight is then allowed to soak in the titration cup in deionized water before a measured amount of NaCl solution (typically 2.0N concentration) is added. The NaCl solution exchange out the proton ions in the electrolyte to turn the soaking solution acidic. A NaOH solution (typically 0.01N concentration) is used to titrate the NaCl soak solution to pH 7 to determine the amount of proton ions exchanged out of the electrolyte. The molar equivalent of the proton in the solution is then divided by the dry weight of the electrolyte sample, and multiplied by 1000 to yield the IEC value of the sample.

As set forth above, the first polymer includes cyclobutyl moiety. Suitable polymers having cyclobutyl moieties are disclosed in U.S. Pat. Pub. No. 2007/0099054, U.S. patent application Ser. No. 12/197530 filed Aug. 25, 2008; Ser. No. 12/197537 filed Aug. 25, 2008; Ser. No. 12/197545 filed Aug. 25, 2008; and Ser. No. 12/197704 filed Aug. 25, 2008; the entire disclosures of which are hereby incorporated by reference. In a variation, the first polymer has a polymer segment comprising polymer segment 1:

$$E_0\text{-}P_1\text{-}Q_1\text{-}P_2 \qquad \qquad 1$$

wherein:

$E_o$ is a moiety having a protogenic group such as —SO$_2$X, —PO$_3$H$_2$, or —COX;

$P_1$, $P_2$ are each independently absent, —O—, —S—, —SO—, —CO—, —SO$_2$—, —NH—, —NR$_2$—, or —R$_3$—;

$R_2$ is C$_{1-25}$ alkyl, C$_{1-25}$ aryl or C$_{1-25}$ arylene;

$R_3$ is C$_{1-25}$ alkylene, C$_{1-25}$ perfluoroalkylene, perfluoroalkyl ether, alkylether, or C$_{1-25}$ arylene;

X is an —OH, a halogen, an ester, or

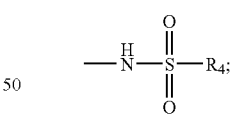

$R_4$ is trifluoromethyl, C$_{1-25}$ alkyl, C$_{1-25}$ perfluoroalkylene, C$_{1-25}$ aryl, or $E_1$(see below); and $Q_1$ is a fluorinated cyclobutyl moiety.

In variation of the present invention, the first polymer comprises polymer segments 2 and 3:

$$[E_1(Z_1)_d]\text{-}P_1\text{-}Q_1\text{-}P_2 \qquad \qquad 2$$

$$E_2\text{-}P_3\text{-}Q_2\text{-}P_4 \qquad \qquad 3$$

wherein:

$Z_1$ is a protogenic group such as —SO$_2$X, —PO$_3$H$_2$, —COX, and the like;

$E_1$ is an aromatic containing moiety;

$E_2$ is an unsulfonated aromatic-containing and/or aliphatic-containing moiety;

X is an —OH, a halogen, an ester, or

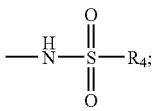

d is the number of $Z_1$ attached to $E_1$;
$P_1$, $P_2$, $P_3$, $P_4$ are each independently: absent, —O—, —S—, —SO—, —CO—, —SO$_2$—, —NH—, —NR$_2$—, or —R$_3$—;
$R_2$ is $C_{1-25}$ alkyl, $C_{1-25}$ aryl, or $C_{1-25}$ arylene;
$R_3$ is $C_{1-25}$ alkylene, $C_{1-25}$ perfluoroalkylene, perfluoroalkyl ether, alkylether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$, $Q_2$ are each independently a fluorinated cyclobutyl moiety. In one refinement, d is equal to the number of aromatic rings in $E_1$. In another refinement, each aromatic ring in $E_1$ can have 0, 1, 2, 3, or 4 $Z_1$ groups.

In another variation of the present embodiment, the first polymer comprises segments 4 and 5:

$$E_1—P_1—Q_1—P_2 \quad\quad 4$$
$$|$$
$$R_8(Z_1)_d$$

$$E_2—P_3—Q_2—P_4 \quad\quad 5$$

wherein:
$Z_1$ is a protogenic group such as —SO$_2$X, —PO$_3$H$_2$, —COX, and the like;
$E_1$, $E_2$ are each independently an aromatic-containing and/or aliphatic-containing moiety;
X is an —OH, a halogen, an ester, or

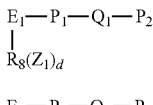

d is the number of $Z_1$ attached to $R_8$;
$P_1$, $P_2$, $P_3$, $P_4$ are each independently absent, —O—, —S—, —SO—, —CO—, —SO$_2$—, —NH—, NR$_2$—, or —R$_3$—;
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkylether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group;
$R_8(Z_1)_d$ is a moiety having d number of protogenic groups; and
$Q_1$, $Q_2$ are each independently a fluorinated cyclobutyl moiety. In a refinement, $R_8$ is $C_{1-25}$ alkylene, $C_{1-25}$ perfluoroalkylene, perfluoroalkyl ether, alkylether, or $C_{1-25}$ arylene. In one refinement, d is equal to the number of aromatic rings in $R_8$. In another refinement, each aromatic ring in $R_8$ can have 0, 1, 2, 3, or 4 $Z_1$ groups. In still another refinement, d is an integer from 1 to 4 on average.

In another variation of the present embodiment, the first polymer comprises segments 6 and 7:

$$E_1(Z_1)_d\text{-}P_1\text{-}Q_1\text{-}P_2 \quad\quad 6$$

$$E_2\text{-}P_3\text{-}Q_2\text{-}P_4 \quad\quad 7$$

connected by a linking group $L_1$ to independently form polymer units 8 and 9:

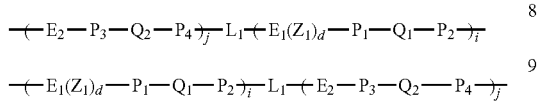

wherein:
$Z_1$ is a protogenic group such as —SO$_2$X, —PO$_3$H$_2$, —COX, and the like;
$E_1$ is an aromatic-containing moiety;
$E_2$ is an unsulfonated aromatic-containing and/or aliphatic-containing moiety;
$L_1$ is a linking group;
X is an —OH, a halogen, an ester, or

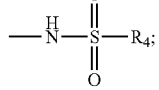

d is a number of $Z_1$ functional groups attached to $E_1$;
$P_1$, $P_2$, $P_3$, $P_4$ are each independently absent, —O—, —S—, —SO—, —SO$_2$—, —CO—, —NH—, NR$_2$—, —R$_3$—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group;
$Q_1$, $Q_2$ are each independently a fluorinated cyclobutyl moiety;
i is a number representing the repetition of polymer segment 6 with i is typically from 1 to 200; and
j is a number representing the repetition of a polymer segment 7 with j typically from 1 to 200. In one refinement, d is equal to the number of aromatic rings in $E_1$. In another refinement, each aromatic ring in $E_1$ can have 0, 1, 2, 3, or 4 $Z_1$ groups.

In still another variation of the present embodiment, the first polymer comprises polymer segments 10 and 11:

$$E_1(Z_1)_d\text{-}P_1\text{-}Q_1\text{-}P_2 \quad\quad 10$$

$$E_2(Z_1)_f\text{-}P_3 \quad\quad 11$$

wherein:
$Z_1$ is a protogenic group such as —SO$_2$X, —PO$_3$H$_2$, —COX, and the like;
$E_1$, $E_2$ is an aromatic or aliphatic-containing moiety wherein at least one of $E_1$ and $E_2$ includes an aromatic substituted with $Z_1$;
X is an —OH, a halogen, an ester, or

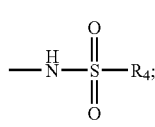

d is the number of $Z_1$ functional groups attached to $E_1$;
f is the number of $Z_1$ functional groups attached to $E_2$;

$P_1$, $P_2$, $P_3$ are each independently absent, —O—, —S—, —SO—, —SO$_2$—, —CO—, —NH—, NR$_2$—, or —R$_3$—;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkyl ether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$ is a fluorinated cyclobutyl moiety, with the proviso that when d is greater than zero, f is zero and when f is greater than zero d is zero. In one refinement, d is equal to the number of aromatic rings in $E_1$. In another refinement, each aromatic ring in $E_1$ can have 0, 1, 2, 3, or 4 $Z_1$ groups. In still another refinement, d is an integer from 1 to 4 on average. In one refinement, f is equal to the number of aromatic rings in $E_2$. In another refinement, each aromatic ring in $E_2$ can have 0, 1, 2, 3, or 4 $Z_1$ groups. In still another refinement, f is an integer from 1 to 4 on average. In a variation, polymer segments 10 and 11 are each independently repeated 1 to 10,000 times to form respective polymer blocks that may be joined with a linking group $L_1$ shown below.

Example for $Q_1$ and $Q_2$ in the above formulae are:

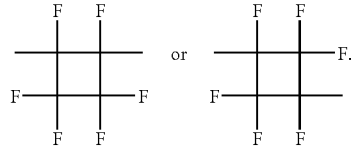

In each of the formulae 1-10, $E_o$, $E_1$ and $E_2$ include one or more aromatic rings. For example, $E_1$ and $E_2$, include one or more of the following moieties:

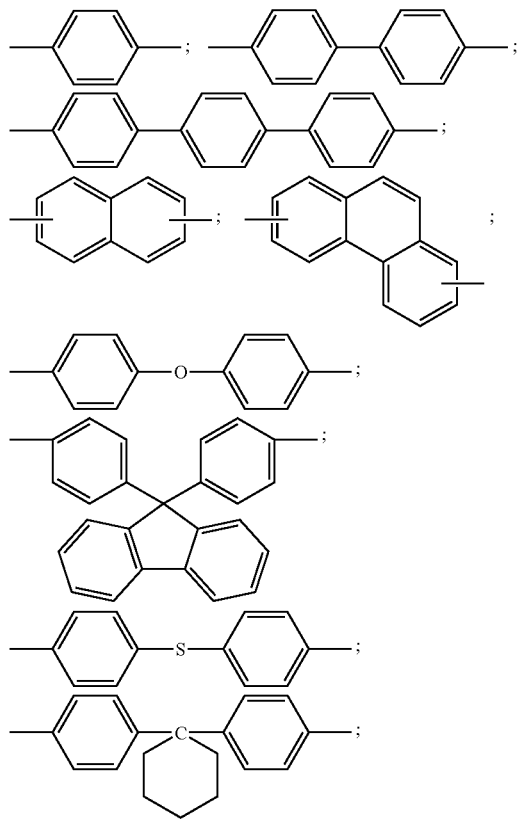

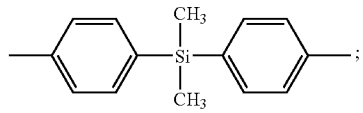

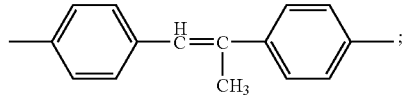

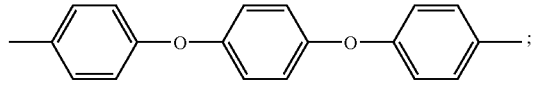

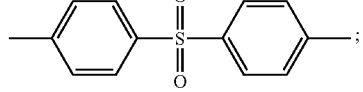

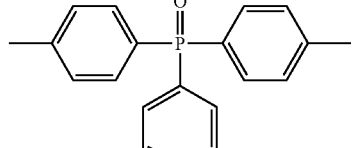

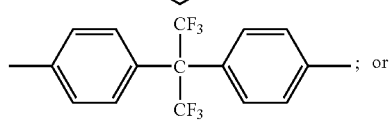

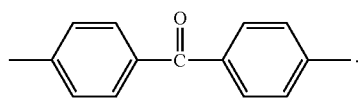

Examples of $L_1$ include the following linking groups:

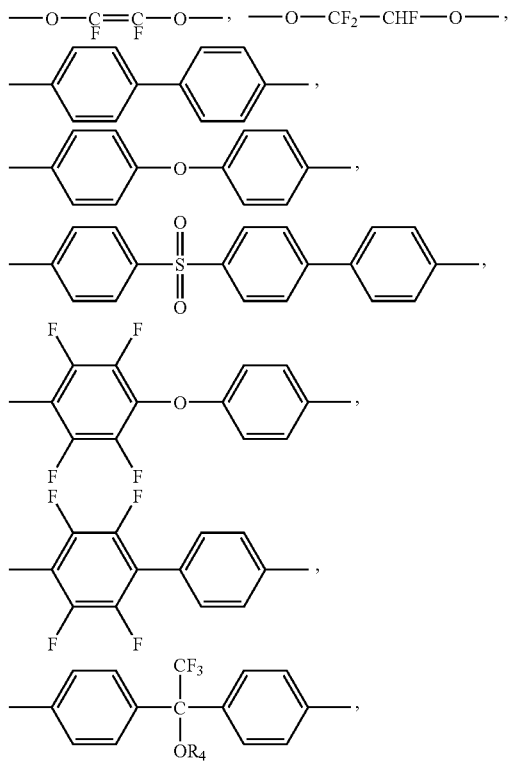

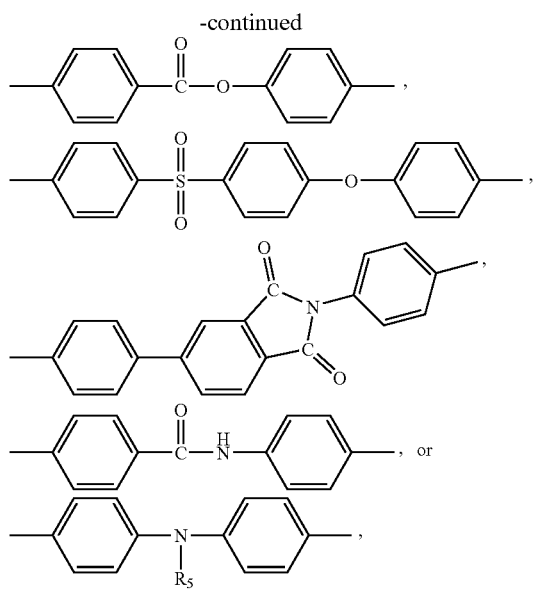

where $R_5$ is an organic group, such as an alkyl or acyl group.

As set forth above, in an embodiment of the present invention, polymeric membrane 26 includes a polymer blend. The polymer blend of this embodiment includes a first polymer and a second polymer. In a variation, the first polymer includes the polymer segment 1 set forth above. The first polymer is different than the second polymer. In one variation, the second polymer is a non-ionic polymer. In a refinement, the non-ionic polymer is a fluorine-containing polymer such as a fluoro-elastomer or fluoro-rubber. The fluoro-elastomer may be any elastomeric material comprising fluorine atoms. The fluoro-elastomer may comprise a fluoropolymer having a glass transition temperature below about 25° C. or preferably, below 0° C. The fluoro-elastomer may exhibit an elongation at break in a tensile mode of at least 50% or preferably at least 100% at room temperature. The fluoro-elastomer is generally hydrophobic and substantially free of ionic group. The fluoro-elastomer may be prepared by polymerizing at least one fluoro-monomer such as vinylidene fluoride, tetrafluoroethylene, hexafluoropropylene, vinylfluoride, vinylchloride, chlorotrifluoroethylene, perfluoromethylvinyl ether, and trifluoroethylene. The fluoro-elastomer may also be prepared by copolymerizing at least one fluoro-monomer and at least one non-fluoro-monomer such as ethylene, propylene, methyl methacrylate, ethyl acrylate, styrene and the like. The fluoro-elastomer may be prepared by free radical polymerization or anionic polymerization in bulk, emulsion, suspension and solution. Examples of fluoro-elastomers include poly(tetrafluoroethlyene-co-ethylene), poly(vinylidene fluoride-co-hexafluoropropylene), poly(tetrafluoroethylene-co-propylene), terpolymer of vinylidene fluoride, hexafluoropropylene and tetrafluoroethylene, and terpolymer of ethylene, tetrafluoroethylene and perfluoromethylvinylether. Some of the fluoro-elastomers are commercially available from Arkema under trade name Kynar Flex® and Solvay Solexis under the trade name Technoflon®, from 3M under the trade name Dyneon®, and from DuPont under the trade name Viton®. For example, Kynar Flex 2751 is a useful copolymer of vinylidene fluoride and hexafluoropropylene with a melting temperature between about 130° C. and 140° C. The glass transition temperature of Kynar Flex 2751 is about −40 to −44° C. The fluoro-elastomer may further comprise a curing agent to allow crosslinking reaction after being blended with a first polymer that includes a perfluorocyclobutyl moiety.

In another variation of this embodiment, the second polymer is a perfluorosulfonic acid polymer (PFSA). In a refinement, such PFSAs are a copolymer containing a polymerization unit based on a perfluorovinyl compound represented by:

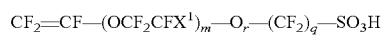

where m represents an integer of from 0 to 3, q represents an integer of from 1 to 12, r represents 0 or 1, and $X^1$ represents a fluorine atom or a trifluoromethyl group and a polymerization unit based on tetrafluoroethylene.

In a variation of this embodiment, the second polymer is present in an amount from about 5 to about 70 weight percent of the total weight of the polymer blend. In a further refinement, the second polymer is present in an amount from about 10 to about 60 weight percent of the total weight of the polymer blend. In still another refinement, the polymer having polymer segment 1 is present in an amount from about 30 to about 95 weight percent of the total weight of the polymer blend. In still another refinement, the polymer having polymer segment 1 (i.e., the first polymer) is present in an amount from about 40 to about 90 weight percent of the total weight of the polymer blend.

The above description of embodiments of the invention is merely exemplary in nature and, thus, variations thereof are not to be regarded as a departure from the spirit and scope of the invention.

What is claimed is:

1. A fuel cell comprising:
   a first flow field plate defining at least one flow field channel;
   a cathode catalyst layer disposed over at least a portion of the first flow field plate;
   a polymeric ion conducting membrane disposed over the cathode catalyst layer, the polymeric ion conducting membrane comprising a blend of a first polymer having a cyclobutyl moiety; and a second polymer having a non-ionic polymer segment, the polymeric ion conducting membrane being spatially non-homogenous such that a weight ratio of the first polymer to the second polymer varies in a plane;
   an anode catalyst layer disposed over the polymeric ion conducting membrane; and
   a second flow field plate defining at least one flow field channel, the polymeric ion conducting membrane extending beyond the cathode catalyst layer and the anode catalyst layer such that the fuel cell has at least one peripheral region with the polymeric ion conducting membrane interposed between the first flow field plate and the second flow field plate without the cathode catalyst layer and the anode catalyst layer.

2. The fuel cell of claim 1 wherein a first gas diffusion layer is interposed between the first flow field plate and the cathode catalyst layer.

3. The fuel cell of claim 2 wherein a second gas diffusion layer is interposed between the second flow field plate and the anode catalyst layer.

4. The fuel cell of claim 1 wherein the polymeric ion conducting membrane comprises polymer segments 2 and 3:

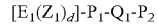      2

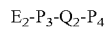      3 wherein:
$Z_1$ is a protogenic group;

$E_1$ is an aromatic containing moiety;
$E_2$ is an unsulfonated aromatic-containing and/or aliphatic-containing moiety;
d is the number of $Z_1$ attached to $E_1$;
$P_1$, $P_2$, $P_3$, $P_4$ are each independently absent, —O—, —S—, —SO—, —CO—, —SO$_2$—, —NH—, —NR$_2$—, or —R$_3$—, and
$R_2$ is $C_{1-25}$ alkyl, $C_{1-25}$ aryl, or $C_{1-25}$ arylene;
$R_3$ is $C_{1-25}$ alkylene, $C_{1-25}$ perfluoroalkylene, perfluoroalkyl ether, alkylether, or $C_{1-25}$ arylene; and
$Q_1$, $Q_2$ are each independently a fluorinated cyclobutyl moiety.

5. The fuel cell of claim 1 wherein the polymeric ion conducting membrane comprises polymer segments 4 and 5:

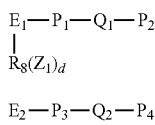

wherein:
$Z_1$ is a protogenic group;
$E_1$, $E_2$ are each independently an aromatic-containing and/or aliphatic-containing moiety;
d is the number of $Z_1$ attached to $R_8$;
$P_1$, $P_2$, $P_3$, $P_4$ are each independently: absent, —O—, —S—, —SO—, —CO—, —SO$_2$—, —NH—, NR$_2$—, or —R$_3$—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkylether, or $C_{1-25}$arylene;
$R_8(Z_1)_d$ is a moiety having d number of protogenic groups; and
$Q_1$, $Q_2$ are each independently a fluorinated cyclobutyl moiety.

6. The fuel cell of claim 5 wherein $R_8$ is $C_{1-25}$ alkylene, $C_{1-25}$ perfluoroalkylene, perfluoroalkyl ether, alkylether, or $C_{1-25}$ arylene.

7. The fuel cell of claim 1 wherein the polymeric ion conducting membrane comprises polymer segments 6 and 7:

$$E_1(Z_1)_d\text{-}P_1\text{-}Q_1\text{-}P_2 \quad\quad 6$$

$$E_2\text{-}P_3\text{-}Q_2\text{-}P_4 \quad\quad 7$$

connected by a linking group $L_1$ to independently form polymer units 8 and 9:

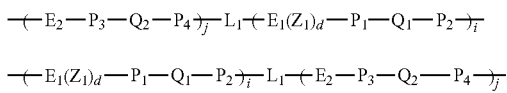

wherein:
$Z_1$ is a protogenic group;
$E_1$ is an aromatic-containing moiety;
$E_2$ is an unsulfonated aromatic-containing and/or aliphatic-containing moiety;
$L_1$ is a linking group;
d is a number of $Z_1$ functional groups attached to $E_1$;
$P_1$, $P_2$, $P_3$, $P_4$ are each independently absent, —O—, —S—, —SO—, —SO$_2$—, —CO—, —NH—, NR$_2$— —R$_3$—, and
$R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, or $C_{1-25}$ arylene;
$Q_1$, $Q_2$ are each independently a fluorinated cyclobutyl moiety;
i is a number representing the repetition of polymer segment 1; and
j is a number representing the repetition of a polymer segment 2.

8. The fuel cell of claim 1 wherein the polymeric ion conducting membrane comprises polymer segments 10 and 11:

$$E_1(Z_1)_d\text{-}P_1\text{-}Q_1\text{-}P_2 \quad\quad 10$$

$$E_2(Z_1)_f\text{-}P_3 \quad\quad 11$$

wherein:
$Z_1$ is a protogenic group;
$E_1$, $E_2$ are each independently an aromatic or aliphatic-containing moiety wherein at least one of $E_1$ and $E_2$ include an aromatic substituted with $Z_1$;
d is the number of $Z_1$ functional groups attached to $E_1$;
f is the number of $Z_1$ functional groups attached to $E_2$;
$P_1$, $P_2$, $P_3$ are each independently absent, —O—, —S—, —SO—, —SO$_2$—, —CO—, —NH—, NR$_2$—, —R$_3$—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkyl ether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$ is a fluorinated cyclobutyl moiety,
with the proviso that when d is greater than zero, f is zero and when f is greater than zero d is zero.

9. The fuel cell of claim 1 wherein the polymeric ion conducting membrane includes a first polymer comprising a perfluorocyclobutyl moiety a second polymer that is blended with the first polymer to form a polymeric blend.

10. The fuel cell of claim 9 wherein the second polymer is a fluoroelastomer.

11. The fuel cell of claim 9 wherein the second polymer is PFSA polymer.

12. The fuel cell of claim 9 wherein the first polymer is present in an amount from about 30 to about 95 weight percent of the total weight of the polymeric blend.

13. A fuel cell comprising:
a first flow field plate defining at least one flow field channel;
a cathode catalyst layer disposed over at least a portion of the first flow field plate;
a polymeric ion conducting membrane disposed over the cathode catalyst layer, the polymeric ion conducting membrane comprising a blend of a first polymer having a cyclobutyl moiety; and a second polymer having a non-ionic polymer segment, the polymeric ion conducting membrane being spatially non-homogenous such that a weight ratio of the first polymer to the second polymer varies in a plane;
an anode catalyst layer disposed over the polymeric ion conducting membrane; and
a second flow field plate defining at least one flow field channel, the polymeric ion conducting membrane extending beyond the cathode catalyst layer and the anode catalyst layer such that the fuel cell has at least one peripheral region with the with the polymeric ion conducting membrane interposed between first flow field plate and the second flow field plate without the cathode catalyst layer and the anode catalyst layer, the polymeric ion conducting membrane comprising a first polymer that includes polymer segment 1:

$$E_0\text{-}P_1\text{-}Q_1\text{-}P_2 \qquad 1$$

wherein:
- $E_o$ is is moiety having a protogenic group;
- $P_1$, $P_2$ are each independently absent, —O—, —S—, —SO—, —CO—, —$SO_2$—, —NH—, —$NR_2$—, or —$R_3$—;
- $R_2$ is $C_{1-25}$ alkyl, $C_{1-25}$ aryl, or $C_{1-25}$ arylene;
- $R_3$ is $C_{1-25}$ alkylene, $C_{1-25}$ perfluoroalkylene, perfluoroalkyl ether, alkylether, or $C_{1-25}$ arylene; and
- $Q_1$ is a fluorinated cyclobutyl moiety.

14. The fuel cell of claim 13 wherein the protogenic group is —$SO_2X$, —$PO_3H_2$, or —COX and X is an —OH, a halogen, an ester, or

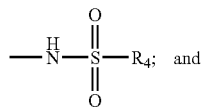

$R_4$ is trifluoromethyl, $C_{1-25}$ alkyl, $C_{1-25}$ perfluoroalkylene, or $C_{1-25}$ aryl.

15. The fuel cell of claim 13 wherein the polymeric ion conducting membrane comprises polymer segments 2 and 3:

$$[E_1(Z_1)_d]\text{-}P_1\text{-}Q_1\text{-}P_2 \qquad 2$$

$$E_2\text{-}P_3\text{-}Q_2\text{-}P_4 \qquad 3$$

wherein:
- $Z_1$ is a protogenic group;
- $E_1$ is an aromatic containing moiety;
- $E_2$ is an unsulfonated aromatic-containing and/or aliphatic-containing moiety;
- d is the number of $Z_1$ attached to $E_1$;
- $P_1$, $P_2$, $P_3$, $P_4$ are each independently absent, —O—, —S—,—SO—,—CO—,—$SO_2$—,—NH—,—$NR_2$, or —$R_3$—, and
- $R_2$ is $C_{1-25}$ alkyl, $C_{1-25}$ aryl, or $C_{1-25}$ arylene;
- $R_3$ is $C_{1-25}$ alkylene, $C_{1-25}$ perfluoroalkylene, perfluoroalkyl ether, alkylether, or $C_{1-25}$ arylene; and
- $Q_1$, $Q_2$ are each independently a fluorinated cyclobutyl moiety.

16. The fuel cell of claim 1 wherein an amount of the second polymer in polymeric ion conductive membrane varies monotonically along a direction from a first location to a second location.

17. The fuel cell of claim 1 wherein an amount of the second polymer is higher in the vicinity of a gas inlet and a gas outlet.

* * * * *